United States Patent [19]

Esser et al.

[11] Patent Number: 4,994,679
[45] Date of Patent: Feb. 19, 1991

[54] METHOD OF MEASURING THE ECCENTRICITY OF A WAVEGUIDE EMBEDDED IN A CYLINDRICAL CONNECTOR PIN

[75] Inventors: Hildegard Esser, Cologne; Ulrich Grzesik, Bergisch Gladbach; Johann Vormann, Lohmar, all of Fed. Rep. of Germany

[73] Assignee: U.S. Philips Corp., New York, N.Y.

[21] Appl. No.: 316,733

[22] Filed: Feb. 28, 1989

[30] Foreign Application Priority Data

Mar. 25, 1988 [DE] Fed. Rep. of Germany ....... 3810057

[51] Int. Cl.$^5$ .......................................... G01N 21/86
[52] U.S. Cl. .............................. 250/561; 250/227.24; 350/96.20
[58] Field of Search .................. 250/561, 227, 227.24; 350/96.20; 33/550

[56] References Cited

U.S. PATENT DOCUMENTS

| | | | |
|---|---|---|---|
| 3,800,388 | 4/1974 | Börner et al. | 29/464 |
| 4,763,980 | 8/1988 | Gerber et al. | 350/96.20 |
| 4,775,947 | 10/1988 | Marron | 33/550 |

*Primary Examiner*—David C. Nelms
*Attorney, Agent, or Firm*—Ernestine C. Bartlett

[57] ABSTRACT

The invention relates to a method of measuring the eccentricity of a waveguide embedded in a cylindrical connector pin. The optical center of the end face of the waveguide is introduced into the mechanical axis of rotation of a distance sensor scanning the outer surface of the connector pin. Subsequently, the eccentricity of the waveguide is determined from the measuring values obtained during the relative rotation of the distance sensor along the outer surface of the connector pin.

13 Claims, 1 Drawing Sheet

METHOD OF MEASURING THE ECCENTRICITY OF A WAVEGUIDE EMBEDDED IN A CYLINDRICAL CONNECTOR PIN

FIELD OF THE INVENTION

BACKGROUND OF THE INVENTION

The invention relates to a method of measuring the eccentricity of a waveguide embedded in a cylindrical connector pin.

In waveguide connector pairs the end faces of waveguides to be coupled must be fixedly and centrically embedded in cylindrical connector pins. The optical axes of the coupled waveguides should preferably be in exact alignment (compare DE-AS 2,159,327 which corresponds substantially to U.S. Pat. No. 3,800,388 issued Apr. 2, 1974). Since the outer surface of the connector serves as a reference surface for aligning the connector pair, the eccentricity of, for example, a monomode waveguide should be less than 0.5 μm if sufficiently small connector attenuations are to be achieved. An accuracy of at least 100 nm should be observed in inspection measurements. Relative to the diameter of the connector sleeve of approximately 1.25 mm, this is a relative accuracy of $8 \times 10^{-5}$.

Known measuring method for measuring the eccentricity of the core of a waveguide relative to its outer cladding surface (for example as described in "Image Sharing Technique", "Fiber Optic Bulletin No. 10 of the Vickers Instruments, 1984") are not suitable for this purpose.

One object of the invention is to provide a measuring method of the type described in the opening paragraph i.e. a method for measuring the eccentricity of a waveguide embedded in a cylindrical connector pin, and to provide a suitable measuring device.

This object is achieved in a method wherein the optical center of the end face of the waveguide is introduced into the mechanical axis of rotation of a distance sensor scanning the outer surface of the connector pin and subsequently the eccentricity of the waveguide is determined form the measuring values obtained during the relative rotation of the distance sensors along the outer surface of the connector pin.

A condition for achieving the desired accuracy is that the relative rotation of the distance sensor about the circumference of the connector pin is effected by means of high-precision bearings. Commercially available shape measuring machines suitable for the purpose described in the present invention have rotational spindles whose eccentricity is less than 40 nm.

Mechanical feelers as well as optically operating devices of known types of suitable as distance sensors. Suitable devices of sufficient measuring accuracy in the nm range are commercially available.

According to the invention a multitude of values measured along the circumference of the connector pin is taken into account for determining the eccentricity of the waveguide so that irregularities of the connector surface do not invalidate the measuring value.

The optical center—generally the center of the end face of a waveguide core—should be introduced into the mechanical axis of rotation with great accuracy, namely with an offset of possibly less than 10 nm. This is preferably accomplished by means of optical adjusting methods in which the light passage between the waveguide arranged in the connector pin and a sensor waveguide arranged substantially coaxially thereto—or reversely—serves as a criterion for achieving the target position. Such adjusting methods are generally known for adjusting two waveguides to be connected.

Very sensitive methods of this type as described in DE-PS 2626243 are particularly suitable.

In a preferred embodiment of the method according to the invention, opposite the end face of the connector pin, a light source or light receiver is arranged which rotates eccentrically around the mechanical axis of rotation, and the connector pin is moved into such a position that a minimum is reached for the fluctuating part of the light energy, which light energy is coupled by the light transmitter into the waveguide or by the waveguide into the light receiver, and which light energy fluctuates in dependence upon the angle of rotation.

However, in an especially preferred embodiment, opposite the end face of the waveguide arranged in the connector pin, a light transmitter or a light receiver is arranged fixedly and eccentrically relative to the mechanical axis of rotation and the connector pin, which is arranged on a mount rotatable about the mechanical axis of rotation, is aligned in such a way that a minimum is reached for the fluctuating part of the light energy coupled by the light transmitter into the waveguide or by the waveguide into the light receiver. This light energy fluctuates in dependence upon the angle of rotation when rotating said pin.

Preferably, the radiation from the light transmitter or to the light receiver is directed via a sensor waveguide to the waveguide arranged in the connector pin. The direction of receiving or transmitting light can then be fixed in a uniform manner, resulting in a narrow light beam.

A possible angle offset of the optical axis of the waveguide relative to the center line of the connector pin can be measured in hat the beam axis of the sensor waveguide is inclined relative to the mechanical axis of rotation and in that the direction of the axis of the connector pin is positioned in such an angle relative to the mechanical axis of rotation that a minimum value is reached for the part of the coupled-in light energy which is dependent on the angle of rotation.

Since in general both the eccentricity and also the angle offset of the waveguide must be measured, it is preferred to move the connector pin axially parallel to the mechanical axis of rotation until a minimum is reached for the part of the coupled in light energy which is dependent on the angle of rotation and to subsequently move the angle position of the connector pin relative to the mechanical axis of rotation while maintaining the position of its end face, preferably, this is accomplished in such a way that substantially the value "zero" is reached for the part of the coupled-in light energy which is dependent on the angle of rotation.

Preferred arrangements for performing the method according to the invention comprise a mount that is rotatable about a mechanical axis of rotation and devices by which a distance sensor scanning the outer surface of the connector pin is rotatable about the mechanical axis of rotation relative to the connector pin. In such arrangements, preferably the connector pin is clamped in a mount arranged on a rotary table which is rotatable about the mechanical axis of rotation and is axially parallel movable relative thereto. Preferably, a sensor waveguide is fixedly connected to the bearing housing of the rotatory table in such a way that its optical axis is eccentric relative to the mechanical axis of rotation of the rotary table and the distance sensor is secured to the bearing housing. In this preferred arrangement also preferably the axis of the sensor waveguide is inclined relative to the mechanical axis of rotation and means are provided for changing the angle of the axial direction of the connector pin.

An alternative method which is particularly suitable for test measurements is characterized in that the connector pin is rotated around its geometrical central axis; a sensor waveguide is arranged substantially axially parallel opposite the end face of the waveguide to be measured, such that its optical axis is offset relative to the mechanical axis of rotation of the connector pin; and the fluctuation amplitude of the light energy coupled by the waveguide to be measured into the sensor waveguide, or conversely, is measured.

BRIEF DESCRIPTION OF THE DRAWINGS

The invention will now be described in greater detail with reference to the accompanying drawing in which.

DETAILED DESCRIPTION OF PREFERRED EMBODIMENTS

Figure 1:
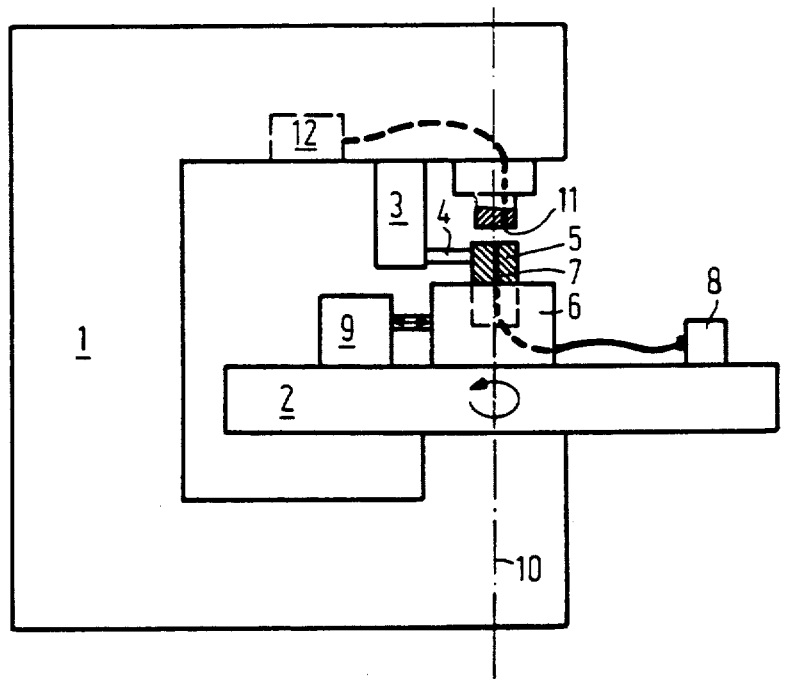
FIG. 1 shows the basic structure of a measuring arrangement according to the invention.

For performing the method according to the invention, as illustrated in FIG. 1, a commercially available shape measuring machine is used, which machine has a frame 1 supporting a rotary table 2 having high precision bearings rotating with an eccentricity of less than 40 nm. The upper arm of the frame 1 is connected to a distance sensor 3 whose feeler 4 scans the surface of the connector pin 5 which is clamped in a mount 6 in such a way that the waveguide 7 in the connector pin 5 initially extends approximately in accordance with the mechanical axis of rotation 10 of the rotary table 2.

The other end of the waveguide 7 is coupled to an optical transmitter 8, for example a laser diode.

The mount can be moved in two mutually perpendicular coordinate directions in the plane of the rotary table 2 by means of manipulators 9, only one of which is shown.

A sensor waveguide 11 is fixed to the upper arm of the frame 1 at a small parallel distance from the mechanical axis of rotation 10 and leads to an optical receiver 12.

FIG. 1, a waveguide 7 arranged off-center relative to the geometrical central axis of the connector pin 5 is shown in the end position to be adjusted in which it is aligned possibly exactly coaxially with the mechanical axis of rotation 10. In this position the connector pin 5 is rotated through approximately 5 min$^{-1}$ by motor-operated rotation of the rotary table 2. The distance values measured throughout the circumference of the distance sensor 3 with reference to the position of the mechanical axis of rotation are evaluated for determining a hypothetical circle of the cylinder surface of the connector pin 5. The distance between the center of the hypothetical circle and the mechanical axis of rotation 10 is then the eccentric offset to be determined for the waveguide 7.

Figure 2:
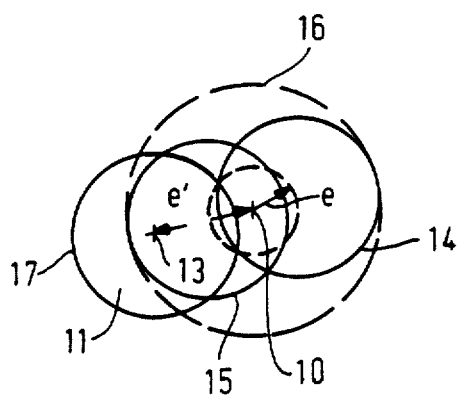
FIG. 2 shows possible positions of the waveguide to be measured relative to a sensor waveguide.

The method of exactly adjusting the end face of the waveguide 7 in the mechanical axis of rotation 10 will be described with reference to FIG. 2.

The optical axis 13 of the sensor waveguide 11 is arranged at a fixed distance e' from the mechanical axis of rotation 10. After the connector pin 5 has been clamped in the mount 6, the optical axis of the waveguide 7 to be measured is eccentrically located beside the mechanical axis of rotation 10 by the value e and when the rotary table 2 is rotating the optical axis moves over the circle, drawn with a dashed line, with radius e within the surface area of the enveloping circle 16. The end faces of the waveguide 7 may then assume the extreme positions denoted by the circles 14 and 15 relative to the circle 17 of the sensor waveguide 11. The light energy between the optical transmitter 8 and the optical receiver 12 fluctuates in accordance with the relative position of the transmitting waveguide and the sensor waveguide. The waveguide 7 is moved by means of the manipulators 9 until the fluctuation of this light energy reaches a minimum value or the value "zero". This is the case when the value e according to FIG. 2 assumes the value "zero", thus if, as envisaged, there is no longer any offset between the optical axis of the waveguide 7 and the mechanical axis of rotation 10.

Figure 3:
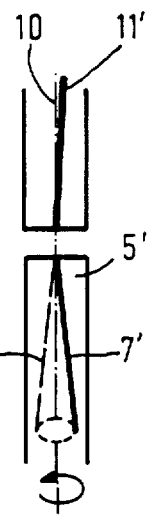
FIG. 3 shows a sensor waveguide whose axis is oblique relative to the mechanical axis of rotation.

It has been tacitly assumed that the optical axes of the waveguides 7 and 11 extend exactly parallel to the mechanical axis of rotation 10. However, the optical axes of waveguides introduced into connector pins may also extend obliquely to the center line of a connector pin. Such an oblique position can be measured if the optical axis 11' of the sensor waveguide is inclined relative to the mechanical axis of rotation, as is shown in FIGS. 3 and 4.

The optical axis of the waveguide 7' arranged obliquely relative to the central axis 17 (FIG. 3) in the connector pin 5' moves over the surface of a cone when rotating the table 2.

In position 7', drawn as a full line, less light is coupled into the waveguide 11' than in the position 7", shown in a broken line, of the waveguide.

Figure 4:
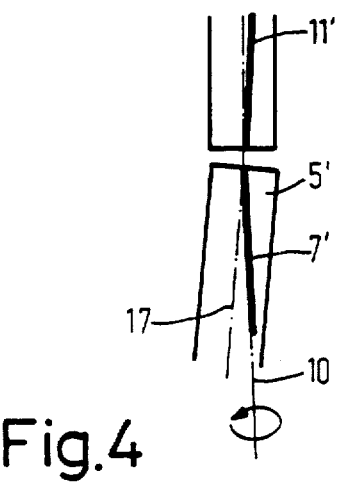
FIG. 4 shows the arrangement according to FIG. 3 after aligning the optical axis of the waveguide to be measured relative to the mechanical axis of rotation.

The position of the angle of the connector pin 5' is moved by means of manipulators until the position shown in FIG. 4 is reached in which the waveguide 5' is aligned possibly exactly coaxially with the mechanical axis of rotation 10. This is the case when a minimum amount of light fluctuations is detected by the receiver 12 when rotating the table 2.

The position of the cylindrical surface of the connector pin 5' can then be detected by means of the distance sensor by measurement in at least two planes.

In practice the inner surface of the waveguide 7' will be aligned centrically relative to the optical axis 10, in which case the oblique position of the waveguide 11' does not yield the the fluctuation value zero of the indication of the optical receiver 12 but rather a minimum value is achieved. Subsequently the angle of the connector pin 5' is aligned in the position according to FIG. 4 while maintaining its end face position. In this position substantially the fluctuation "zero" of the energy detected by the receiver 12 is measured.

The sensor waveguide 11 and the waveguide 7 to be measured should possibly have the same diameter. However, since the adjusting accuracy does not essentially depend on the relative diameters, waveguides whose diameters considerably differ from that of the sensor waveguide 11 can also be measured.

The offset e' (FIG. 2) of the sensor waveguide 11 relative to the mechanical axis of rotation 10 should be 0.5 to 1.5 times the core diameter of the waveguide 7 to be measured so as to achieve a high measuring sensitivity. However, such an offset need not be predetermined with great precision.

In the embodiment described the waveguides 11 and 7 are monomode waveguides having a core diameter of 9 μm. The axis offset e' of the sensor waveguide 11 relative to the mechanical axis of rotation 10 was 10 μm.

The arrangement shown in FIG. 1 enables the optical axes of the waveguide 7 to be adjusted in the mechanical axis of rotation 10 with an error of less than 10 nm. The stability with respect to time of the transmission energy of the optical transmitter 8 need not be subjected to strict requirements because no absolute values of the optical energy need to be measured when adjusting the waveguide 7 to be measured.

However, in an alternative method the fluctuation amplitude of the light energy of the receiver 12 may also be directly utilized as a measure of the eccentricity to be determined for a waveguide. The connector pin 5 is then clamped coaxially relative to the mechanical axis of rotation 10. Assuming that the light energy of the optical transmitter 8 is constant, the fluctuation amplitude of the indication of the optical receiver 12 is then uniformly dependent on the eccentricity e of the waveguide 7 to be measured, so that after a corresponding calibration the eccentricity e can be directly read. However, such a direct measuring method does not permit of an extreme measuring accuracy because the measuring value is dependent on the stability of the transmitted light energy.

Contaminations of the end faces of the waveguides 7 and 11 may be a further source of error. Such a method is, however, very simple and is therefore satisfactorily suitable for measurements carried out to inspect the manufacturing quality.

We claim:

1. A method of measuring the eccentricity of a waveguide embedded in a cylindrical connector pin, wherein the optical center of the end face of the waveguide is introduced into the mechanical axis of rotation of rotatable means comprising a distance sensor scanning the outer surface of the connector pin, the eccentricity of the waveguide being determined from the measuring values obtained during the relative rotation of the means comprising the distance sensor along the outer surface of the connector pin.

2. A method of measuring the eccentricity of a waveguide embedded in a cylindrical connector pin, wherein:
   the connector pin is rotated about is geometrical central axis;
   a sensor waveguide is arranged substantially axially parallel opposite the end face of the waveguide to be measured so that its optical axis is offset relative to the mechanical axis of rotation of the connector pin;
   light energy from a light source or light receiver is arranged to rotate about the mechanical axis of rotation, which energy fluctuates in dependence on the angle of rotation, the fluctuation amplitude of the light energy benign coupled by the waveguide to be measured into the sensor waveguide.

3. A method of measuring the eccentricity of a waveguide embedded in a cylindrical connector pin wherein the optical center of the end face of the waveguide is introduced into the mechanical axis of rotation of rotatable means comprising a distance sensor scanning the outer surface of the connector pin, the eccentricity of the waveguide being determined from the measuring values obtained during the relative rotation of the means comprising the distance sensor along the outer surface of the connector pin,
   and wherein an opposite the end face of the connector pin a light transmitter or light receiver which emanates or receives light energy, respectively, is arranged which rotates eccentrically around the mechanical axis of rotation, the connector pin being moved into such a position that a minimum is reached for the fluctuating part of the light energy coupled by the light transmitter into the waveguide or by the waveguide into the light receiver, which light energy fluctuates in dependence upon the angle of rotation when rotating said pin.

4. A method of measuring the eccentricity of a wave guide embedded in a cylindrical connector pin wherein the optical center of the end face of the waveguide is introduced into the mechanical axis of rotation of rotatable means comprising a distance sensor scanning the outer surface of the connector pin, the eccentricity of the waveguide being determined from the measuring values obtained during the relative rotation of the means comprising the distance sensor along the outer surface of the connector pin,
   and wherein opposite the end face of the waveguide arranged in the connector pin a light transmitter or a light receiver which emanate or recieve light energy, respectively, is arranged fixedly and eccentrically relative to the mechanical axis of rotation, the connector pin being arranged on a mount rotatable about the mechanical axis of rotation and being so aligned that a minimum is reached for the fluctuating part of the light energy coupled by the light transmitter into the waveguide or by the waveguide into the light receiver, which light energy fluctuates in dependence upon the angle of rotation when rotating said pin.

5. A method as claimed in claim 3 or 4 wherein the light energy is radiation form the light transmitter or to the light receiver which is directed via a sensor waveguide to the waveguide arranged in the connector pin.

6. A method as claim in claim 3 or 4 wherein the light energy is radiation from the light transmitter or to the light receiver which is directed via a sensor waveguide to the waveguide arranged in the connector pin and the beam axis of the sensor waveguide is inclined relative to the mechanical axis of rotation, the direction of the axis of the connector pin being positioned in such an angle relative to the mechanical axis of rotation that a minimum value is reached for the part of the coupled light energy which is dependent on the angle of rotation.

7. A method as claimed in claim 6 wherein the connector pin is moved axially parallel to the mechanical axis of rotation until a minimum is reached for the part of the coupled light energy which is dependent on the angle of rotation and subsequently the angle position of the connector pin relative to the mechanical axis of rotation is moved while maintaining the position of its end face whereby substantially the value "zero" is reached for the part of the coupled light energy which is dependent on the angle of rotation.

8. An arrangement for measuring the eccentricity of a waveguide embedded in a cylindrical connector pin wherein the optical center of the end face of the waveguide is introduced into rotatable means comprising a distance sensor scanning the outer surface of the connector pin and the eccentricity of the waveguide is determined from the measuring values obtained during the relative rotation of the distance sensor along the outer surface of the connector pin, said arrangement comprising:

a mount which is rotatable about a mechanical axis of rotation; and means for rotating a distance sensor scanning the outer surface of the connection pin, said sensor being rotatable about the mechanical axis of rotation relative to the connector pin.

9. An arrangement for measuring the eccentricity of a waveguide embedded in a cylindrical connector pin wherein the optical center of the end face of the waveguide is introduced into rotatable means comprising a distance sensor scanning the outer surface of the connector pin and the eccentricity of the waveguide is determined from the measuring values obtained during the relative rotation of the distance sensor along the outer surface of the connector pin, said arrangement comprising:

a frame (1) supporting a rotary table having (a) bearings rotating with an eccentricity of less than 40 nm, (b) a mechanical axis of rotation, and (c) a mount comprising clamping means and manipulators, the mount being movable by the manipulators; and (2) having an upper arm connected to a distance sensor comprising a feeler which scans the surface of a connection pin clamped in the mount;

a waveguide to be measured a portion of which is embedded in the connector pin and connected at one end to an optical transmitter, said waveguide extending approximately in accordance with the mechanical axis of rotation of the rotary table; and a sensor waveguide fixed to the upper arm of said frame at a parallel distance from the mechanical axis of rotation of the rotary table in a position opposite the mount bearing the connection pin and connected at one end to an optical receiver.

10. An arrangement as claim in claim 9 including means for measuring distance values throughout the circumference of the distance sensor with reference to the position of the mechanical axis of rotation.

11. An arrangement as claimed in claim 9 or 10 including means for adjusting the end face of the waveguide to be measured in the mechanical axis of rotation.

12. An arrangement for measuring the eccentricity of a waveguide embedded in a cylindrical connector pin wherein the optical center of the end face of the waveguide is introduced into rotatable means comprising a distance sensor scanning the outer surface of the connector pin and the eccentricity of the waveguide is determined form the measuring values obtained during the relative rotation of the distance sensor along the outer surface of the connector pin, said arrangement comprising:

a mount which is rotatable about a mechanical axis of rotation; and means for rotating a distance sensor scanning the outer surface of the connection pin, said sensor being rotatable about the mechanical axis of rotation relative to the connector pin, the connector pin being clamped in a mount arranged on a rotary table which comprises a bearing housing and is rotatable about the mechanical axis of rotation and is axially parallel movable relative thereto, a sensor waveguide being fixedly connected to the bearing housing of the rotary table in such a way that its optical axis is eccentric relative to the mechanical axis of rotation of the rotary table and the distance sensor being secured to the bearing housing.

13. An arrangement as claim ed in claim 12, wherein the axis of the sensor waveguide is inclined relative to the mechanical axis of rotation and said arrangement also comprises means for changing the angle of the axial direction of the connector pin.

* * * * *